(12) United States Patent
Goldenberg et al.

(10) Patent No.: US 7,669,475 B2
(45) Date of Patent: Mar. 2, 2010

(54) SYSTEM AND METHOD FOR MEASURING ROTATIONAL MOVEMENT ABOUT AN AXIS

(75) Inventors: Felix Goldenberg, Sunrise, FL (US); Ryan Nielsen, Apple Valley, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 374 days.

(21) Appl. No.: 11/764,558

(22) Filed: Jun. 18, 2007

(65) Prior Publication Data

US 2008/0121054 A1 May 29, 2008

Related U.S. Application Data (60) Provisional application No. 60/827,328, filed on Sep. 28, 2006.

(51) Int. Cl.
*G01P 9/04* (2006.01)

(52) U.S. Cl. .................. 73/504.12; 73/504.13

(58) Field of Classification Search ............ 73/504.02, 73/504.04, 504.12, 504.13, 504.14, 504.15
See application file for complete search history.

(56) References Cited

U.S. PATENT DOCUMENTS

| | | | | |
|---|---|---|---|---|
| 5,703,292 A | * | 12/1997 | Ward | 73/504.02 |
| 5,955,668 A | | 9/1999 | Hsu et al. | |
| 6,151,964 A | * | 11/2000 | Nakajima | 73/504.13 |
| 6,244,095 B1 | * | 6/2001 | Nozoe et al. | 73/1.82 |
| 6,553,833 B1 | * | 4/2003 | Funk et al. | 73/504.14 |
| 6,934,665 B2 | * | 8/2005 | Rober | 702/189 |
| 7,159,461 B2 | * | 1/2007 | Gallon et al. | 73/504.12 |
| 7,275,433 B2 | * | 10/2007 | Caminada et al. | 73/514.18 |
| 7,305,880 B2 | * | 12/2007 | Caminada et al. | 73/504.04 |

OTHER PUBLICATIONS

Huikai Xie and G.K. Fedder, A DRIE CMOS-MEMS Gyroscope, IEEE Sensors 2002 Conference, Orlando, FL, Jun. 2002.
Y.S. Hong et al., A Laterally Driven Symmetric Micro-Resonator for Gyroscopic Applications, Journal Micromechanics, Microengineering, vol. 10, pp. 452-458, 2000.
A. Shkel et al., Modeling and Simulation of Micromachined Gyroscopes in the Presence of Imperfections, Proceedings of International Conference on Modeling and Simulation of Microsystems, Apr. 1999.

\* cited by examiner

*Primary Examiner*—Helen C. Kwok
(74) *Attorney, Agent, or Firm*—Calfee, Halter & Griswold LLP (57) ABSTRACT

In one embodiment, a micro-gyro device for measuring rotational movement about an input axis includes a driving element generating a driving signal. A MEMS gyro includes a motor rotor and a motor assembly. The motor rotor receives the driving signal and oscillates about a motor axis at a frequency determined as a function of the driving signal. The motor assembly oscillates around a rate axis, which is orthogonal to the motor axis, as a function of the frequency of the motor rotor oscillation. A capacitance of the motor assembly changes as a function of the oscillation of the motor assembly. Driving element feedback circuitry, including a first band-pass filter, is between the motor rotor and the driving element. The driving element feedback circuitry causes the driving element to generate the driving signal as a function of an amplitude of the motor rotor oscillation for maintaining the amplitude of the motor rotor oscillation within a predetermined range. Output circuitry, including a second band-pass filter, produces an output signal as a function of the changing capacitance of the motor assembly. The first and second band-pass filters have central frequency phase characteristics not exceeding about 0.1°/Hz.

20 Claims, 7 Drawing Sheets

| TEMPERATURE (DEGREES C) | BIAS WITHOUT FILTER (VDC) | BIAS WITH FILTER (VDC) | DIFFERENCE (VDC) | BIAS REDUCTION (PERCENT) |
|---|---|---|---|---|
| -40 | 3.76 | 3.6 | 0.16 | 12.70 |
| 20 | 3.53 | 3.4 | 0.13 | 12.62 |
| 50 | 3.49 | 3.41 | 0.08 | 8.08 |
| 80 | 3.52 | 3.42 | 0.10 | 9.80 |

Fig. 8

SYSTEM AND METHOD FOR MEASURING ROTATIONAL MOVEMENT ABOUT AN AXIS

This application claims the benefit of U.S. Provisional Application No. 60/827,328, filed Sep. 28, 2006, which is hereby incorporated by reference.

BACKGROUND

The present invention relates to Strapdown Navigation Technology. It finds particular application in conjunction with micro-electro-mechanical systems (MEMS) gyroscopes used as angular rate sensors in Inertial Measurement Units (IMU) and strapdown Inertial Navigation System (INS) for aircraft, missiles, land and underwater vehicles navigation, guidance and control and will be described with particular reference thereto. It will be appreciated, however, that the invention is also amenable to other applications.

The capabilities of the current photolithography processes and microfabrications techniques are inadequate when compared with the requirements for production of high performance MEMS inertial sensors. The resulting inherent imperfections in manufacturing of MEMS gyro sense elements mechanical structure significantly limit the performance, and robustness of MEMS gyroscopes. Because reliable MEMS gyroscopes require tight tolerances (e.g., picometer-scale), MEMS gyroscopes have proven challenging to fabricate and commercialize for high-performance.

The present invention provides a new and improved apparatus and method which addresses the above-referenced problems.

SUMMARY

In one embodiment, a micro-gyro device for measuring rotational movement about an input axis includes a driving element generating a driving signal. A MEMS gyro includes a motor rotor and a motor assembly. The motor rotor receives the driving signal and oscillates about a motor axis at a frequency determined as a function of the driving signal. The motor assembly oscillates around a rate axis, which is orthogonal to the motor axis, as a function of the frequency of the motor rotor oscillation. A capacitance of the motor assembly changes as a function of the oscillation of the motor assembly. Driving element feedback circuitry, including a first band-pass filter, is between the motor rotor and the driving element. The driving element feedback circuitry causes the driving element to generate the driving signal as a function of an amplitude of the motor rotor oscillation for maintaining the amplitude of the motor rotor oscillation within a predetermined range. Output circuitry, including a second band-pass filter, produces an output signal as a function of the changing capacitance of the motor assembly. The first and second band-pass filters have central frequency phase characteristics not exceeding about 0.1°/Hz.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to exemplify the embodiments of this invention.

DETAILED DESCRIPTION OF ILLUSTRATED EMBODIMENT

Figure 1:
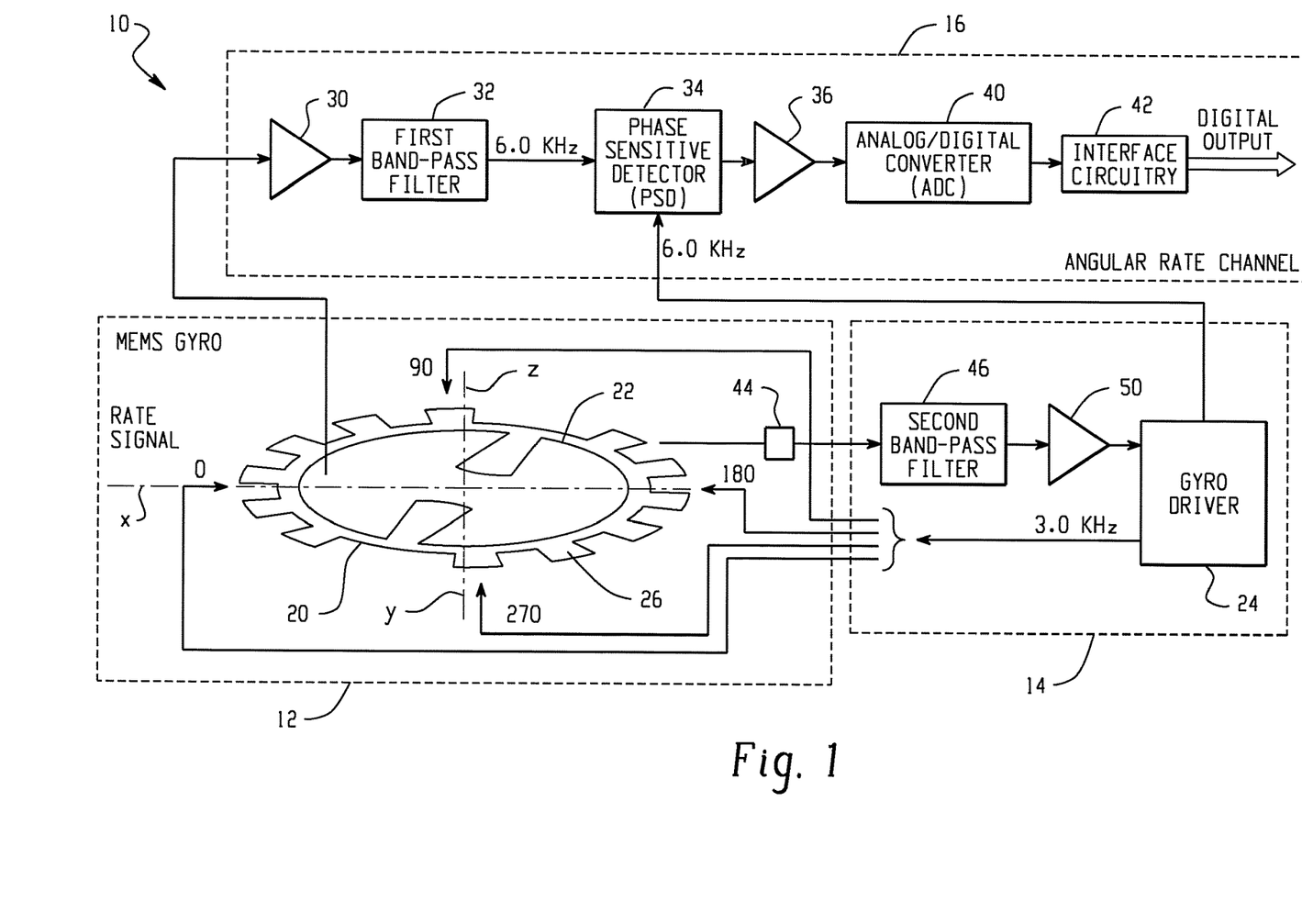
FIG. 1 illustrates a schematic representation of a MEMS gyro system in accordance with one embodiment of an apparatus illustrating principles of the present invention.

With reference to FIG. 1, a MEMS gyro 10 includes a sensing element 12 (e.g., a MEMS Coriolis force sensing element), servo-electronics 14, and angular rate channel output circuitry 16. The sensing element 12 includes an outer gimbal 20 (e.g., an outer motor rotor) and an inner gimbal 22 (e.g., a motor assembly). The inner gimbal 22 is encircled by the outer gimbal 20. The servo-electronics 14 includes a gyro driver (GD) 24 (driving element).

The gyro driver 24 generates a driving signal that is electrically transmitted to combs 26 of the outer gimbal 20. In one embodiment, the driving signal has an excitation voltage frequency f of about 3.0 kHz. It is contemplated that the driving signal is a square wave applied at combs 26 spaced apart 90° around the outer gimbal 20. The outer motor rotor 20 oscillates around a drive axis Z in accordance with the driving signal. In the contemplated embodiment, the rotor 20 oscillates at a frequency 2f (e.g., about 6.0 kHz). Oscillation of the outer gimbal 20 causes the inner gimbal 22 to rock around an input axis X at an angular rate ω. When an angular rate ω acts around an input axis X, a Coriolis force proportional to the applied angular rate is transmitted from the motor rotor 20 to the inner gimbal 22 (motor assembly), thereby forcing the motor assembly 22 to rock with the same frequency (about 6.0 kHz) around an output axis Y.

A capacitive pick-off is disposed under the motor assembly 22 and converts oscillation of the motor assembly 22 around the X axis into an electrical signal proportional to the input angular rate. The electrical signal is transmitted to a preliminary amplifier 30 and filtered by first band-pass filter circuitry 32, which is discussed in more detail below. The amplified and filtered electrical signal is converted into DC voltage by a phase sensitive detector (PSD) 34. The DC voltage is buffered by an amplifier 36 and then converted into digital format by an analog-to-digital converter (ADC) 40. The digital signal is then converted into serial code by an interface circuitry 42. The gyro driver 24 controls an oscillation amplitude of the motor rotor 20 via a comb position sensor 44, which transmits a signal representing a position of one of the combs 26 to the gyro driver 24 via second band-pass circuitry 46, which is discussed in more detail below, and an amplifier 50. The position sensor 44 and second band-pass circuitry 46 provides a driving element feedback circuitry. The gyro driver 24 also includes phase-lock-loop (PLL) circuitry (not shown), which uses the comb position signal to form the switching voltage frequency 2f in phase with the angular rate signal fed into the phase sensitive detector 34 through the amplifier 30 and the first band-pass filter circuitry 32.

Conventional 4-phase drive circuitry secures electrical cancellation of the drive frequency f on capacitive pick-off. Therefore, it is theoretically expected that the only 2f signal proportional to the applied angular rate ω presents in the pick-off output. In this case, the DC voltage output (U) of the phase sensitive detector 34 is described by the following equation:

$$U = K(U_{2f} \cos \phi + U_q \sin \phi) \quad (1)$$

where:

$U_{2f}$ is the second harmonic signal proportional to the applied angular rate;

$U_q$ is the quadrature of the second harmonic signal presenting in the pick-off output due to the imperfection of MEMS Sense Element manufacturing;

$\phi$ is the phase shift between second harmonic signal and switching voltage applied to the phase sensitive detector 34 from the gyro driver 24; and K is the phase sensitive detector gain.

The excitation matching mode (electrical cancellation of the first harmonic of the drive frequency in pick-off circuitry) and the quadrature error due to inherent fabrication imperfections are two major challenges in MEMS gyro development. Since the employment of the phase-lock-loop circuitry in the gyro driver 24 maintains the phase shift φ=0 (zero), the quadrature error is reduced and/or minimized. However, the balancing/cancellation of drive circuitry to eliminate the first harmonic feedthrough into the capacitive pick-off is not achieved. Meanwhile, the presence of the first harmonic degrades signal to noise ratio (S/N), and results in restriction of the preliminary amplifier 30 gain, which is specifically crucial for a MEMS gyro operating in a closed-loop mode. Balancing of excitation circuitry by additional capacitive network is not accurate enough and is a highly time consuming process.

Figure 2:
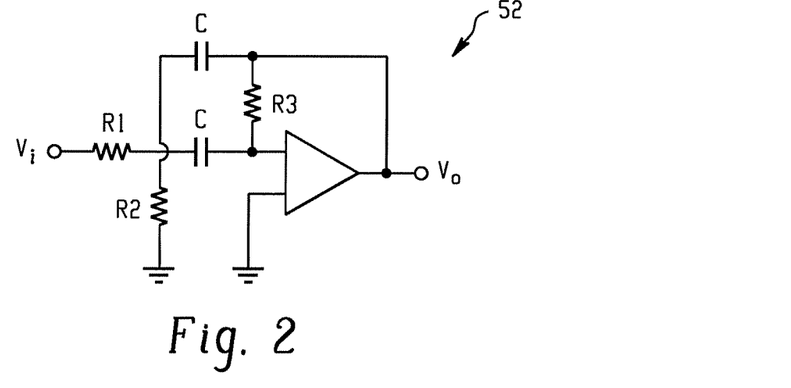
FIG. 2 illustrates a schematic representation of the first and second band-pass filter circuitries of FIG. 1 in accordance with one embodiment of the present invention.

With reference to FIG. 2, a first embodiment of the first and second band-pass filter circuitries 32, 46 (see FIG. 1) include a filter 52 (e.g., a high-Q, wide band band-pass filter) to suppress the first and all odd harmonics on the input of amplifier 30. In one embodiment, the filter 52 is a band-pass filter having a Q of at least about 10 (where Q=center frequency $\omega_0$/bandwidth β). It is contemplated that bandwidth is at least about 250 Hz at a central frequency of about 6.0 kHz.

For the second-order band-pass filter 52, the transfer function ($H_s$) is given by:

$$H_s = \frac{V_o}{V_i} = \frac{H_o \beta S}{S^2 + \beta S + \omega_0^2} \quad (2)$$

where $\omega_0$ is the center frequency;

β is the bandwidth; and $H_0$ is the maximum amplitude of the filter.

$$\omega_0 = \frac{1}{C\sqrt{\frac{R_1 R_2}{R_1 + R_2} R_3}}; \beta = \frac{2}{CR_3}; B = \frac{\beta}{2\pi}; f_0 = \frac{\omega_0}{2\pi} \quad (3)$$

Figure 2A:
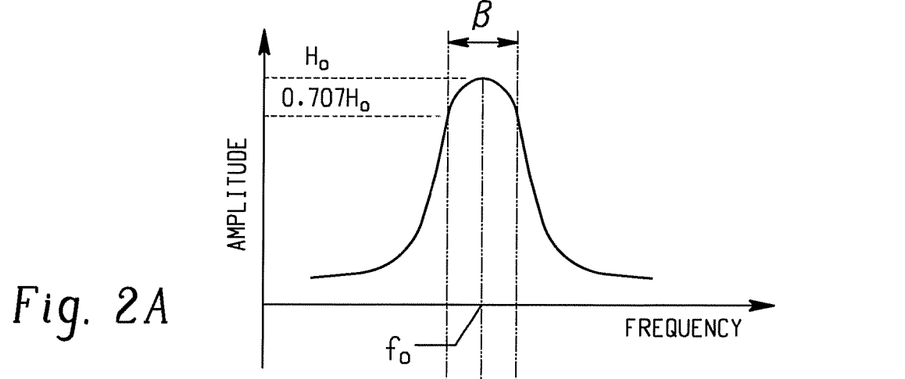
FIGS. 2A and 2B illustrate graphs showing amplitude versus frequency and phase shift versus frequency associated with FIG. 2.
Figure 2B:
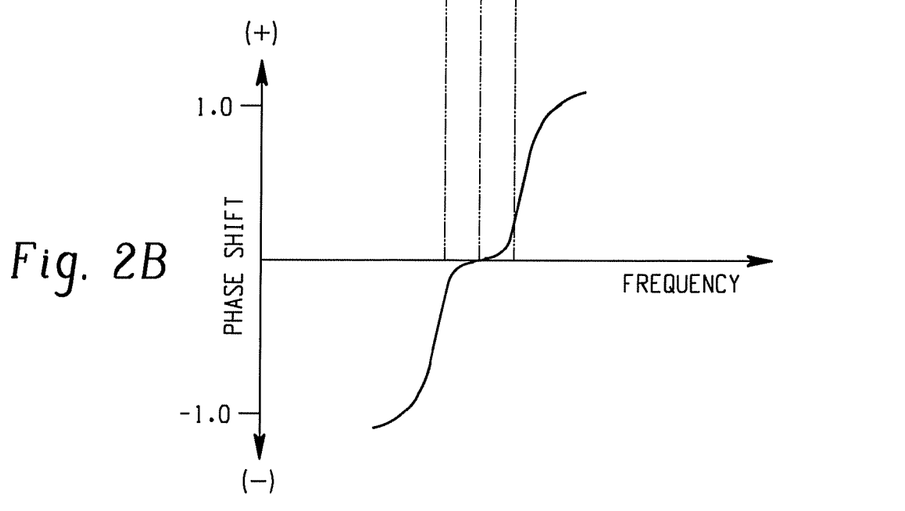

Using the formulas (3) presented above, a high-Q band-pass filter may be designed for a specific resonance frequency. Due to the manufacturing imperfection, the motor resonance frequency (said 3000 Hz) of the MEMS sensing element 12 is varying in the range of ±50 Hz, which corresponds to ±100 Hz variation in the second harmonic rate signal. A resonance frequency shift of ±25 Hz over temperature is an additional factor to consider. Thus, to minimize the phase shift φ which might be introduced by such a band-pass filter the bandwidth β should be at least 250 Hz, which is very challenging to achieve in combination with a high level of suppression (at least 15-20 times) in conventional open-loop gyro operation for first and third harmonics. For closed-loop operation gyros, where big gain is a crucial parameter to achieve desirable accuracy and wide frequency response band, even more effective suppression is desired. FIG. 2A illustrates the bandwidth β. FIG. 2B illustrates the phase shift.

Figure 3:
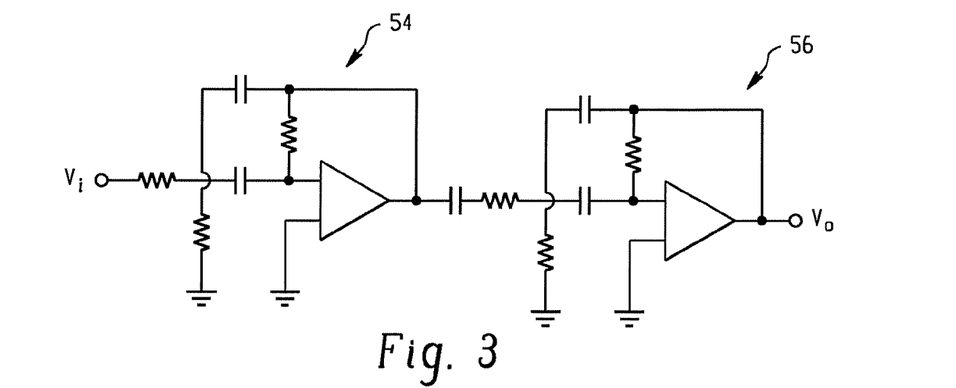
FIG. 3 illustrates a schematic representation of the first and second band-pass filter circuitries of FIG. 1 in accordance with another embodiment of the present invention.
Figure 3A:
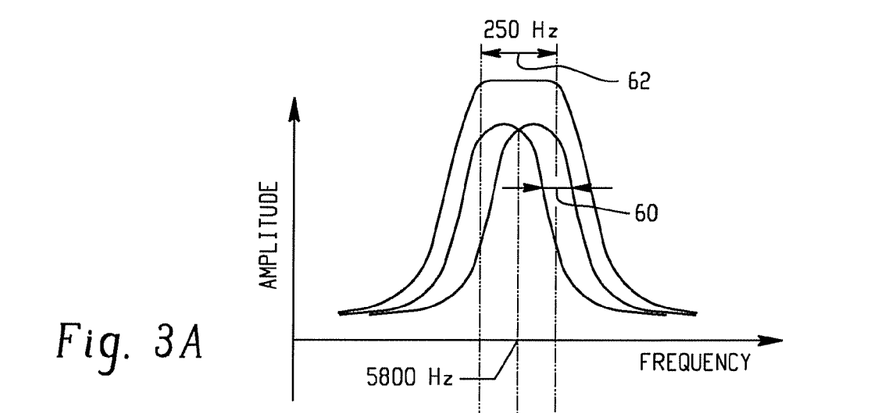
FIGS. 3A and 3B illustrate graphs showing amplitude versus frequency and phase shift versus frequency associated with FIG. 3.
Figure 3B:
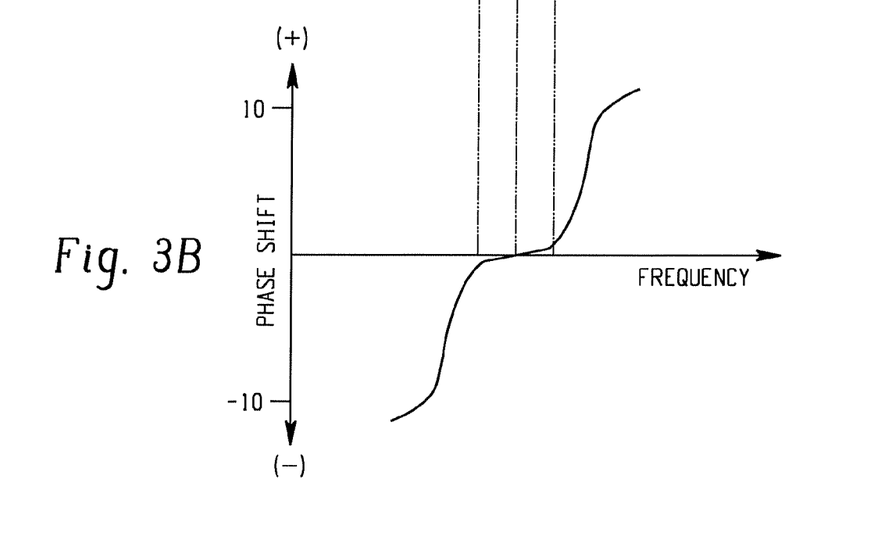

FIG. 3 illustrates a second embodiment of the first and second band-pass filter circuitries 32, 46 (see FIG. 1) including cascading two (2) high-Q band-pass filters 54, 56 connected in series. A desirable band may be achieved due to the separation 60 (see FIG. 3A) of resonance frequencies of filters by a predetermined distance (in Hz). An additional benefit gained with the solution illustrated in this embodiment is a flatness 62 (see FIG. 3B) of the phase characteristic. In this manner, phase shift introduced into gyro servo-electronics by such a filter may be reduced and/or minimized.

Figure 4:
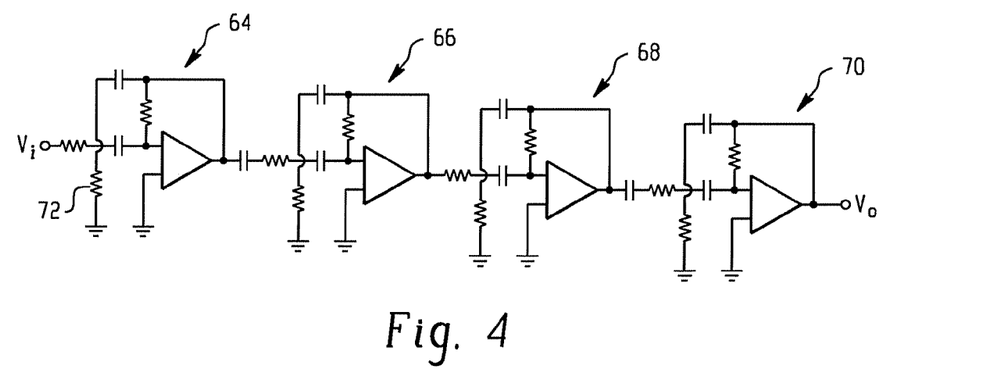
FIG. 4 illustrates a schematic representation of the first and second band-pass filter circuitries of FIG. 1 in accordance with another embodiment of the present invention.

FIG. 4 illustrates a third embodiment of the first and second band-pass filter circuitries 32, 46 (see FIG. 1) including multi-cascading four filters 64, 66, 68, 70 according to the principles described above with reference to FIG. 3. With reference to FIG. 4, a desirable resonance frequency adjustment and separation in resonance frequency may be adjusted by changing a resistor value of a single resistor 72 (see FIG. 1 and Formulas 3). The single quad-amplifier based 4-cascade active band-pass filter 64, 66, 68, 70 shown in FIG. 4 may offer more effective phase shift control.

Figure 4A:
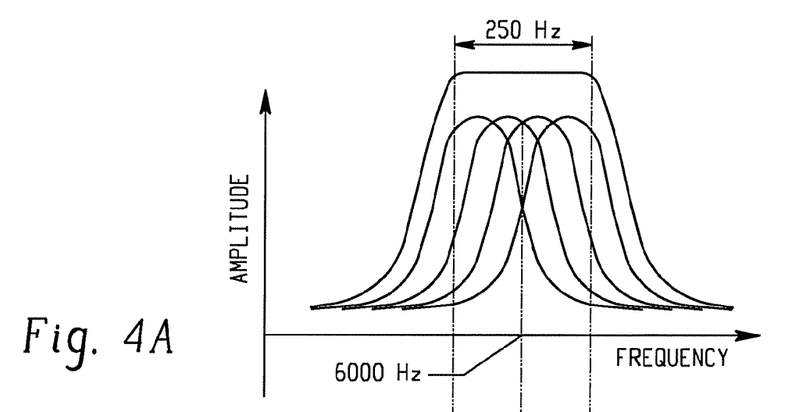
FIGS. 4A and 4B illustrate graphs showing amplitude versus frequency and phase shift versus frequency associated with FIG. 4.
Figure 4B:
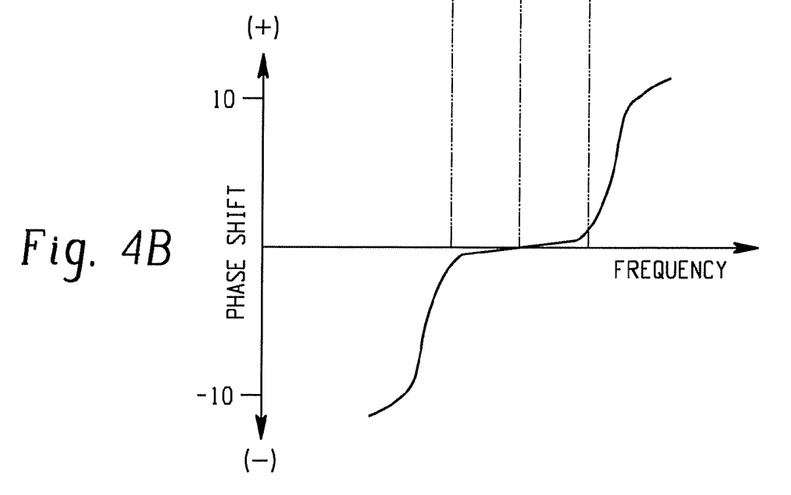

At a 6000 Hz central frequency and a 62 Hz separation between resonance frequencies of filters connected in series, a band of about 250 Hz (see FIG. 4A) with an expanded flatness (see FIG. 4B) of the phase characteristic is achieved to secure that manufacturing imperfections and temperature variations of the gyro MEMS sensing element 12 are covered. The scale of phase characteristic of a filter in the area of central frequency does note exceed about 0.1°/Hz.

The embodiments described above accommodate imperfections of the MEMS sensing element 12 manufactured by existing technology without following time consuming capacitive networks adjustment. This is achieved by implementation of the first and second band-pass filter circuitries 32, 46. In the embodiment illustrated in FIGS. 3 and 4, the first and second band-pass filter circuitries 32, 46 are cascaded band-pass filters (CBPF) incorporated into the MEMS gyro signal processing electronics. With reference again to FIG. 1, the first and second band-pass filter circuitries 32, 46 include band-pass filters with matching phase characteristics implemented into the angular rate channel output circuitry 16 and the motor servo-electronics 14. In one embodiment, the band-pass filter circuitries 32, 46 are substantially identical. Unique amplitude and phase performance are achieved by connecting a number of high-Q band-pass filters—with predetermined, incrementally spaced resonance frequencies as described above—in series.

In the example illustrated in FIG. 1, when the angular rate ω is acting around the input axis X, Coriolis force proportional to the applied angular rate is transmitted from the outer motor rotor 20 to the inner motor assembly 22. The transmitted force causes the motor assembly 22 to rock with the same frequency (6.0 kHz) around the output axis Y. Capacitive pick-off disposed under the motor assembly 22 converts oscillation of the motor assembly 22 into an electrical signal proportional to the input angular rate, which is fed into the preliminary amplifier 30. The electrical signal is filtered of first and third harmonics in the CBPFs 32, 46 and then converted into DC voltage by the phase sensitive detector 34. The DC voltage is buffered by the amplifier 36 and converted into digital format by the analog-to-digital converter 40. The resulting digital signal is then converted into serial code by the interface circuitry 42. The motor driving signal is transmitted from the motor ring 26 into the CBPF 46 and filtered of first and third harmonics. The filtered signal is then amplified by the amplifier 50 and fed into the gyro driver 24. The gyro driver 24 controls the amplitude of oscillation of the outer motor rotor 20 and provides a switching voltage for the PSD 34.

Including the two CBPFs 32, 46 with matching phase characteristics in the angular rate channel output circuitry 16 and the servo-electronics 14, respectively, reduce and/or minimize the gyro error due to the variation of the phase shift φ between the second harmonic rate signal and the switching voltage on the phase sensitive detector 34.

The illustrated embodiments include the MEMS gyro with the MEMS Coriolis force sensing element 12, the rate signal processing electronics 16 and the motor signal processing electronics 14 with first and second band-pass filter circuitries 32, 46 having matching phase characteristics, each including at least one high-Q band-pass filter. It is also contemplated that multi-cascaded high-Q band-pass filters are included in the first and second band-pass filter circuitries 32, 46. Unique amplitude and phase characteristics of the multi-cascade high-Q band-pass filters are achieved by connecting in series a number (e.g., four (4)) of high-Q band-pass filters 64, 66, 68, 70 with predetermined, incrementally spaced resonance frequencies.

The embodiments discussed above provide a MEMS gyro having an increased yield due to a wider tolerance for acceptable level of contamination of a rate signal by first, third, and higher harmonics. A DC bias shift in the rate signal is also reduced.

Figure 5A:
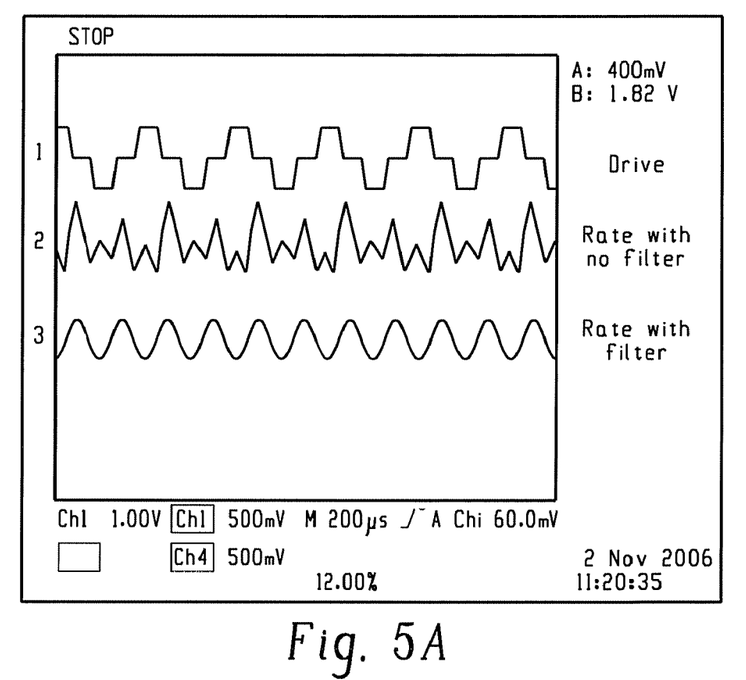
FIGS. 5A, 5B, and 6-8 illustrate experimental results of a cascaded band-pass filter investigation.
Figure 5B:
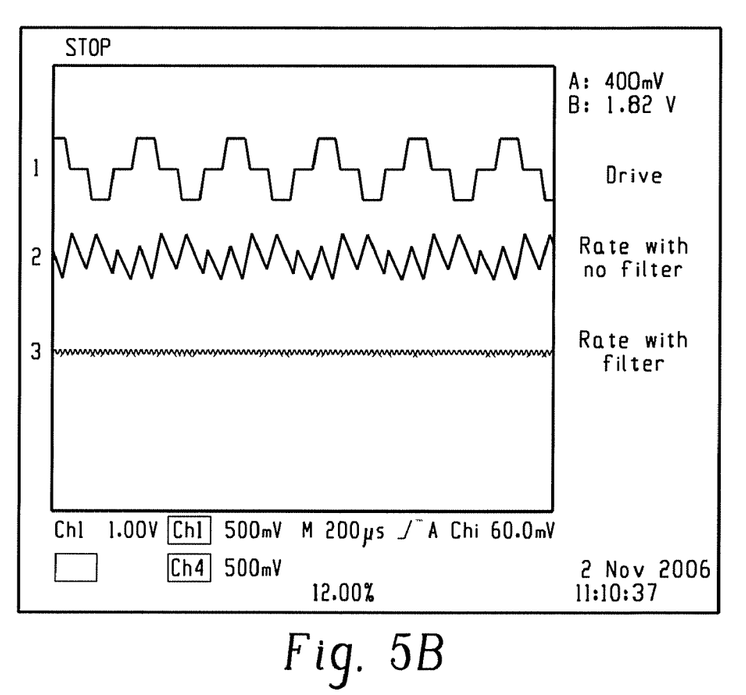
Figure 6:
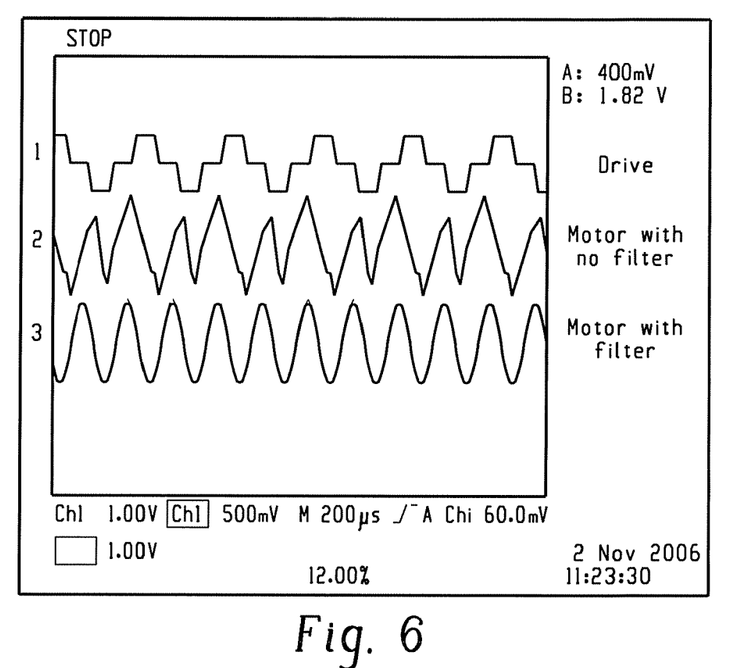
Figure 7:
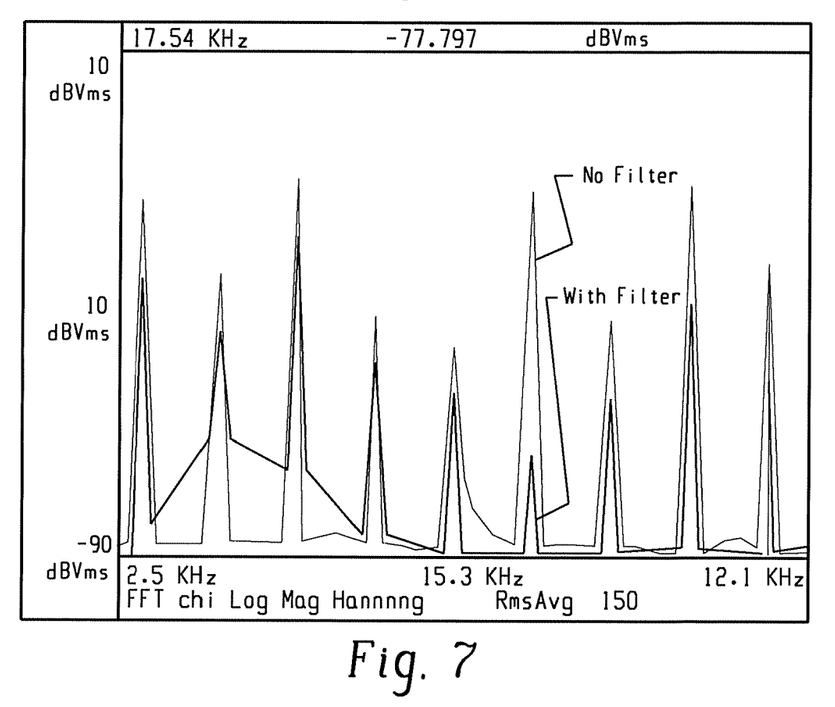
Figure 8:
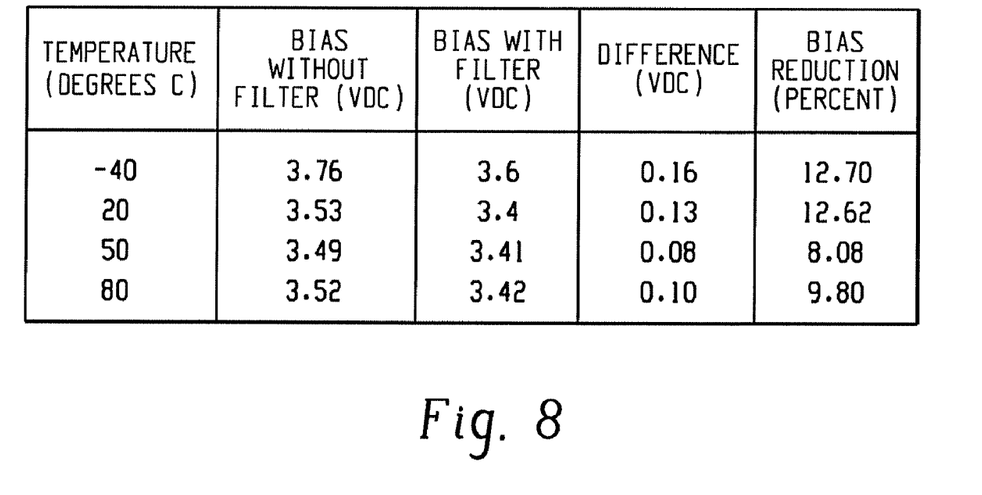

Experimental results including a CBPF investigation are illustrated in FIGS. 5A, 5B, and 6-8. FIGS. 5A and 5B illustrate experimental data of an improvement to the rate channel signal when input angular rate is applied to the gyro (FIG. 5A), and without input angular rate (FIG. 5B), when the gyro is in a static condition. FIG. 6 illustrates an improvement of a corrupted motor signal. FIG. 7 illustrates that about a −77 dB suppression of a 6th harmonics in a rate signal, and a DC bias reduction up to 12.7% is achieved due to such suppression as shown in the test results summarized in the table shown in FIG. 8.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

We claim:

1. A micro-gyro device for measuring rotational movement about an input axis, comprising:

a driving element generating a driving signal;

a MEMS gyro including a motor rotor and a motor assembly, the motor rotor receiving the driving signal and oscillating about a motor axis at a frequency determined as a function of the driving signal, the motor assembly oscillating around a rate axis, which is orthogonal to the motor axis, as a function of the frequency of the motor rotor oscillation, a capacitance of the motor assembly changing as a function of the oscillation of the motor assembly;

driving element feedback circuitry, including a first band-pass filter, between the motor rotor and the driving element, the driving element feedback circuitry causing the driving element to generate the driving signal as a function of an amplitude of the motor rotor oscillation for maintaining the amplitude of the motor rotor oscillation within a predetermined range; and output circuitry, including a second band-pass filter, producing an output signal as a function of the changing capacitance of the motor assembly, the first and second band-pass filters having central frequency phase characteristics not exceeding about 0.1°/Hz.

2. The micro-gyro device as set forth in claim 1, wherein a Coriolis force, created by oscillation of the motor rotor, causes the motor assembly to oscillate.

3. The micro-gyro device as set forth in claim 1, further including:

a third band-pass filter electrically connected in series with the first band-pass filter; and a fourth band-pass filter electrically connected in series with the second band-pass filter, the third and fourth band-pass filters having central frequency phase characteristics not exceeding about 0.1°/Hz.

4. The micro-gyro device as set forth in claim 1, wherein:

the phase shift between both of the first and second band-pass filters at a central frequency is about zero.

5. The micro-gyro device as set forth in claim 4, wherein the central frequency is about 6.0 kHz.

6. The micro-gyro device as set forth in claim 1, wherein the first and second band-pass filters have a Q of at least about 10 and a bandwidth of at least about 250 Hz at a central frequency of about 6.0 kHz.

7. The micro-gyro device as set forth in claim 1, further including:

a plurality of first additional band-pass filters electrically multi-cascaded with the first band-pass filter; and a plurality of second additional band-pass filters electrically multi-cascaded with the second band-pass filter, the plurality of first and second additional band-pass filters having central frequency phase characteristics not exceeding about 0.1°/Hz.

8. The micro-gyro device as set forth in claim 7, wherein:

a bandwidth of the first band-pass filter and the first additional band-pass filters is about 250 Hz at a central frequency of about 6.0 kHz; and a bandwidth of the second band-pass filter and the second additional band-pass filters is about 250 Hz at a central frequency of about 6.0 kHz.

9. The micro-gyro device as set forth in claim 8, wherein:

the first band-pass filter and the first additional band-pass filters have respective predetermined and respective incrementally spaced resonance frequencies; and the second band-pass filter and the second additional band-pass filters have the respective predetermined and the respective incrementally spaced resonance frequencies.

10. A micro-gyro device for measuring rotational movement about an input axis, comprising:

a driving element generating a driving signal;

a MEMS gyro including a motor rotor and a motor assembly, the motor rotor receiving the driving signal and oscillating about a motor axis at a frequency determined as a function of the driving signal, the motor assembly oscillating around a rate axis, which is orthogonal to the motor axis, as a function of the frequency of the motor rotor oscillation, a capacitance of the motor assembly changing as a function of the oscillation of the motor assembly;

driving element feedback circuitry, including a first plurality of cascaded band-pass filters, between the motor rotor and the driving element, the driving element feedback circuitry causing the driving element to generate the driving signal as a function of an amplitude of the motor rotor oscillation for maintaining the amplitude of the motor rotor oscillation within a predetermined range; and output circuitry, including a second plurality of cascaded band-pass filters, producing an output signal as a function of the changing capacitance of the motor assembly, the first and second plurality of band-pass filters having matching phase characteristics.

11. The micro-gyro device as set forth in claim 10, wherein:

the first plurality of band-pass filters have respective predetermined and respective incrementally spaced resonance frequencies; and the second plurality of band-pass filters have respective predetermined and respective incrementally spaced resonance frequencies.

12. The micro-gyro device as set forth in claim 11, wherein:

a bandwidth of the first plurality of band-pass filters is about 250 Hz at a central frequency of about 6.0 kHz; and a bandwidth of the second plurality of band-pass filters is about 250 Hz at a central frequency of about 6.0 kHz.

13. The micro-gyro device as set forth in claim 12, wherein:

the spaced resonance frequencies between each of the band-pass filters in the first plurality and second plurality of band-pass filters is about 62 Hz; and respective central frequencies of the bandwidths of the first and second plurality of band-pass filters is about 6.0 kHz.

14. The micro-gyro device as set forth in claim 13, wherein each of the band-pass filters in the first plurality and second plurality of band-pass filters includes:

a respective resistor, the respective resonance frequencies of the band-pass filters being determined as a function of the resistances of the respective resistors.

15. The micro-gyro device as set forth in claim 10, wherein each the band-pass filters in the first plurality and the second plurality of band-pass filters have a Q of at least about 10 and a bandwidth of at least about 250 Hz at a central frequency of about 6.0 kHz.

16. The micro-gyro device as set forth in claim 10, wherein the first plurality and the second plurality of band-pass filters reduce higher order harmonics.

17. A method for filtering signals, the method comprising:

generating a driving signal;

creating an oscillation about a motor axis at a frequency determined as a function of the driving signal;

creating an oscillation about a rate axis, which is orthogonal to the motor axis, as a function of the frequency of the oscillation about the motor axis;

filtering a feedback signal representing the oscillation about the motor axis via a central frequency phase characteristic not exceeding about 0.1°/Hz;

producing an output signal as a function of the oscillation around the rate axis; and filtering the output signal via a central frequency phase characteristic not exceeding about 0.1°/Hz.

18. The method for filtering signals as set forth in claim 17, further including:

maintaining an amplitude of the oscillation about the motor axis within a predetermined range as a function of the filtered feedback signal.

19. The method for filtering signals as set forth in claim 17, wherein:

the step of filtering the feedback signal includes reducing higher order harmonics; and the step of filtering the output signal includes reducing the higher order harmonics.

20. The method for filtering signals as set forth in claim 17, wherein:

the step of filtering the feedback signal includes filtering the feedback signal through a bandwidth of about 250 Hz; and the step of filtering the output signal includes filtering the output signal through a bandwidth of about 250 Hz.

* * * * *